United States Patent [19]

Aldrich et al.

[11] Patent Number: 4,689,888

[45] Date of Patent: Sep. 1, 1987

[54] MEASURING DEVICE FOR USE WITH AUTOMOTIVE FRAME STRAIGHTENING EQUIPMENT

[75] Inventors: Roger B. Aldrich; Gary R. White, both of Grand Island, Nebr.

[73] Assignee: Chief Automotive Systems, Inc., Grand Island, Nebr.

[21] Appl. No.: 921,749

[22] Filed: Oct. 22, 1986

[51] Int. Cl.$^4$ .................... G01B 5/25; G01B 11/27
[52] U.S. Cl. ......................... 33/288; 33/600; 33/666
[58] Field of Search ........... 33/180 AT, 181 AT, 191, 33/193, 288

[56] References Cited

U.S. PATENT DOCUMENTS

| Re. 31,636 | 7/1984 | Chisum | 72/305 |
|---|---|---|---|
| 1,404,096 | 1/1922 | Decatur | 33/180 AT |
| 2,000,866 | 5/1935 | Smith | 33/288 |
| 2,401,980 | 6/1946 | Smith | 33/288 |
| 2,481,420 | 9/1949 | Hanson | 33/288 |
| 2,575,194 | 11/1951 | Smith | 33/288 |
| 2,581,021 | 1/1952 | Jacobsen et al. | 33/288 |
| 3,057,074 | 10/1962 | Sidwell | 33/191 |
| 3,151,396 | 10/1964 | Junkins | 33/288 |
| 3,583,823 | 6/1971 | Eaton et al. | 33/191 |
| 3,611,575 | 10/1971 | Chartier | 33/288 |
| 3,630,066 | 12/1971 | Chisum | 72/305 |
| 3,786,572 | 1/1974 | Larson | 33/288 |
| 3,810,313 | 5/1974 | Hicks | 33/288 |
| 3,869,804 | 3/1975 | Friend | 33/288 |
| 3,983,635 | 10/1976 | Jarman | 33/288 |
| 4,006,532 | 2/1977 | Hallman | 33/288 |
| 4,015,339 | 4/1977 | Horvallius | 33/288 |
| 4,165,567 | 8/1979 | Olsson | 33/288 |
| 4,207,681 | 6/1980 | Bayorgeon et al. | 33/180 AT |
| 4,302,883 | 12/1981 | MacGregor | 33/180 AT |
| 4,342,154 | 8/1982 | Legrand | 33/180 AT |
| 4,366,624 | 1/1983 | Bergstrom | 33/180 AT |
| 4,375,131 | 3/1983 | Jarman et al. | 33/288 |
| 4,441,259 | 4/1984 | Leitermann et al. | 33/288 |
| 4,479,305 | 10/1984 | Wendl et al. | 33/180 AT |
| 4,490,918 | 1/1985 | Clausen | 33/288 |
| 4,513,508 | 4/1985 | Jarman et al. | 33/288 |
| 4,523,384 | 6/1985 | Giacomini | 33/180 AT |
| 4,621,435 | 11/1986 | Higginbotham | 33/288 |

FOREIGN PATENT DOCUMENTS 55600 9/1912 Austria ........................... 33/191

Primary Examiner—Richard R. Stearns
Attorney, Agent, or Firm—Allegretti, Newitt, Witcoff & McAndrews, Ltd.

[57] ABSTRACT

An improved measuring bar device includes first and second parallel bars retained in a center housing by an array of biased and canted rollers that engage cam surfaces defined by the bars to provide for equal and opposite movement of the bars while maintaining the bars in parallel array.

13 Claims, 6 Drawing Figures

MEASURING DEVICE FOR USE WITH AUTOMOTIVE FRAME STRAIGHTENING EQUIPMENT

BACKGROUND OF THE INVENTION

This invention relates to apparatus for visually aligning reference points on a damaged vehicle and for visually determining the extent of deviation of such reference points from set or known standards.

Various apparatus or equipment are known for correcting misalignment of vehicles by returning frame and body members of vehicles back to their predamaged locations. Equipment of this nature is utilized by personnel in body shops and other service and repair shops. Typical of such equipment is the apparatus disclosed in U.S. Pat. No. 3,630,066 entitled "Apparatus for Returning Vehicle Body and Frame Components to Their Original Locations During Repair and Servicing of Vehicles," issued Dec. 28, 1971, and U.S. Pat No. Re. 31,636 entitled "Auto Body and Frame Straightening Device", reissued July 1, 1984 on a patent issued June 10, 1975. Both of the referenced patents are incorporated herewith by reference.

The effective use of such equipment in the process of applying pulling forces to a vehicle body is enhanced by various gauging and measuring systems that provide an indication of the magnitude of misalignment or deviation of the component parts of the vehicle body to an operator of the alignment equipment. There are many such measuring systems that have been disclosed in prior art patents including the following:

| Pat. No. | Inventor | Title | Issue Date |
| --- | --- | --- | --- |
| 3,869,804 | Friend | Vehicle Frame Alignment Gage | 3/11/75 |
| 4,165,567 | Olsson | Checking and Measurement Device for Automotive Chassis | 8/28/79 |
| 4,207,681 | Bayorgeon, et al. | Vehicle Measuring Bridge | 6/17/80 |
| 4,302,883 | MacGregor | Vehicle Frame, Body and Wheel Alignment Gauge | 12/1/81 |
| 4,342,154 | Legrand | Measuring Bridge | 8/3/82 |
| 4,366,624 | Bergstrom | Arrangement for Benches for Measuring and Straightening Vehicles | 1/4/83 |
| 4,479,305 | Wendl, et al. | Measuring Bridge | 10/30/84 |
| 4,490,918 | Clausen | Vehicle Frame Measurement Device | 1/1/85 |
| 4,513,508 | Jarman, et al. | Vehicle Body and Frame Measuring Device | 4/30/85 |
| 4,523,384 | Giacomini | Method and Apparatus for Measuring Deviations in Vehicle Bodies or Frames | 6/18/85 |

Typically, these prior art patents disclose a framework which is attached to a vehicle body or to a platform which supports a vehicle body. The framework includes various scales and associated slidable or fixed pointers. The pointers may be aligned with selected reference points of the vehicle body. The distance between a selected reference point and a fixed, known reference point (known as a datum point) is then measured. If the measured distance varies from known specifications, then the selected reference point is not in the required or standard position. Frame straightening equipment may then be utilized to bend and reform the vehicle body and thereby move the selected reference point to its required or standard position.

One of these very basic measuring or gauging systems comprises a series of transverse bars which are suspended at spaced intervals along the longitudinal axis beneath an automobile. Typically the bars are attached at their opposite ends to the underframe of the vehicle so that a center line pointer supported by each bar is located at the center line of the vehicle. If the vehicle frame or body is undamaged, the center line pointer of each transverse bar will lie on a common longitudinal axis of the vehicle and the transverse bars will lie in a common horizontal plane. On the other hand, if the vehicle frame or body is damaged, there will be misalignment of the pointers and bars.

By applying appropriate strains to the frame and body using frame straightening equipment, the damaged frame or body can be reformed to its orginal specification condition. Such reformation is visually ascertainable by observation of the center pointers and transverse bars. Once such pointers and bars are aligned, the frame has been straightened.

The general construction and theory of operation of the pointers and transverse bars used in such a system are well known to those of ordinary skill in the art. Typical of such constructions are those depicted in the following patents:

| Pat. No. | Inventor | Title | Issue Date |
| --- | --- | --- | --- |
| 1,404,096 | Decatur | Centering Device | 1/17/22 |
| 2,000,866 | Smith | Chassis Checking Gauge | 5/7/35 |
| 2,401,980 | Smith | Means for Gauging Vehicle Frames | 6/11/46 |
| 2,481,420 | Hanson | Hydraulic Action Center Gauge | 9/6/49 |
| 2,575,194 | Smith | Motor Vehicle Frame Alignment Measuring Mechanism | 11/13/51 |
| 2,581,021 | Jacobsen, et al. | Bilaterally and Uniformly Extensible Unit | 1/1/52 |
| 3,057,074 | Sidwell | Automobile and Truck Frame Body Alignment Gauges | 10/9/62 |
| 3,151,396 | Junkins | Vehicle Frame Gauge | 10/6/64 |
| 3,611,575 | Chartier | Auto Frame Alignment Apparatus | 10/12/71 |
| 3,786,572 | Larson | Gauge for Use in Straightening Automotive Frames | 1/22/74 |
| 3,810,313 | Hicks | Vehicle Frame Gauge | 5/14/74 |
| 3,983,635 | Jarman | Auto Frame Gauge | 10/5/76 |
| 4,006,532 | Hallman | Gauge for Measuring Vehicle Frame Alignment | 2/8/77 |
| 4,015,339 | Horvallius | Measuring Tool for Frameworks | 4/5/77 |
| 4,375,131 | Jarman, et al. | Vehicle Frame Datum Line Reference System | 3/1/83 |
| 4,441,259 | Leitermann, et al. | Method and Means for In Situ Determination of Alignment of a Vehicle Frame | 4/10/84 |

Systems of this type are very useful. However, their utility is dependent upon the ease of adjustment of the transverse bars among other things. Also, the transverse bars are typically comprised of a pair of parallel bars slidable relative to each other. The bars are retained in a support housing. Often the bars will wrap or bend in the housing. Thus, there has developed a need to provide an improved transverse bar construction of the type which is easily adjustable in length and which is easily readable. These goals, among others, inspired the present invention.

SUMMARY OF THE INVENTION

Briefly, the present invention relates to an improved measuring bar device for use in combination with similar devices and with automotive frame straightening equipment. The measuring bar device is generally comprised of a pair of parallel, elongated bars slidable through a housing. The bars are slidable with respect to each other in opposite directions in order to effectively lengthen or shorten the total length of the bar assembly. The bars are retained by the special housing which includes an internal assembly of rollers that engage with the bars frictionally in order to ensure their movement in generally equal and opposite directions. The housing also supports a center line pointer extending transverse to the bars.

A plurality of the measuring bar devices may be suspended from a vehicle body or frame in order to visually determine the extent of misalignment of the vehicle frame. Color coding of alternate bar devices facilitates this visual observation. Each bar device also includes means for adjusting the relative position of the bars with respect to each other in order to accomodate the situation wherein the longitudinal datum line or axis of the vehicle is offset from the actual center line of the vehicle.

Thus, it is an object to provide an improved measuring bar device for use in combination with automotive frame straightening equipment.

A further object of the invention is to provide an improved measuring bar device comprised of first and second separate bars supported by a single housing constructed to insure that the bars are movable in equal and opposite directions relative to one another.

Yet a further object of the invention is to provide an improved measuring bar device which is economical to make, easy to use and which has a simplified, yet rugged construction.

Another object of the invention is to provide a measuring bar device comprised of a pair of bars slidably mounted in a support housing which maintains the bars in parallel, undeformed relation generally unaffected by wear and usage.

Another object of the invention is to provide a measuring bar device comprised of a pair of bars slidably mounted in a support housing with a center line alignment pin on the housing.

Another object of the invention is to provide a measuring bar device comprised of a pair of bars slidably mounted in a support housing that imposes a minimum obstruction of the bars.

These and other objects, advantages and features of the invention will be set forth in the detailed description which follows.

BRIEF DESCRIPTION OF THE DRAWING

In the detailed description which follows, reference will be made to the drawing comprised of the following figures.

DESCRIPTION OF THE PREFERRED EMBODIMENT

Figure 1:
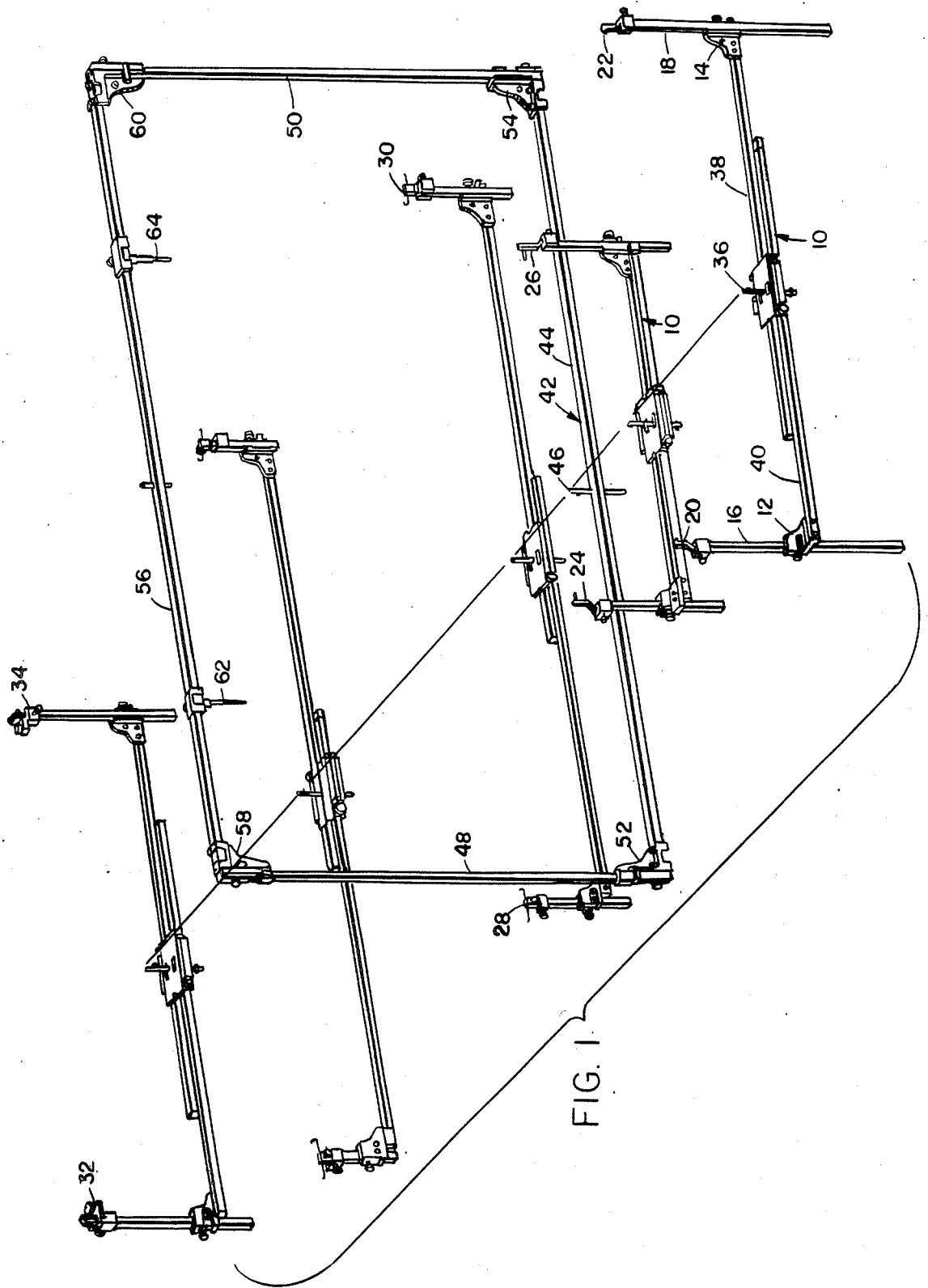
FIG. 1 is a perspective view depicting the improved bar device of the present invention in combination with like bar devices as part of a total gauging or measuring system.
Figure 2:
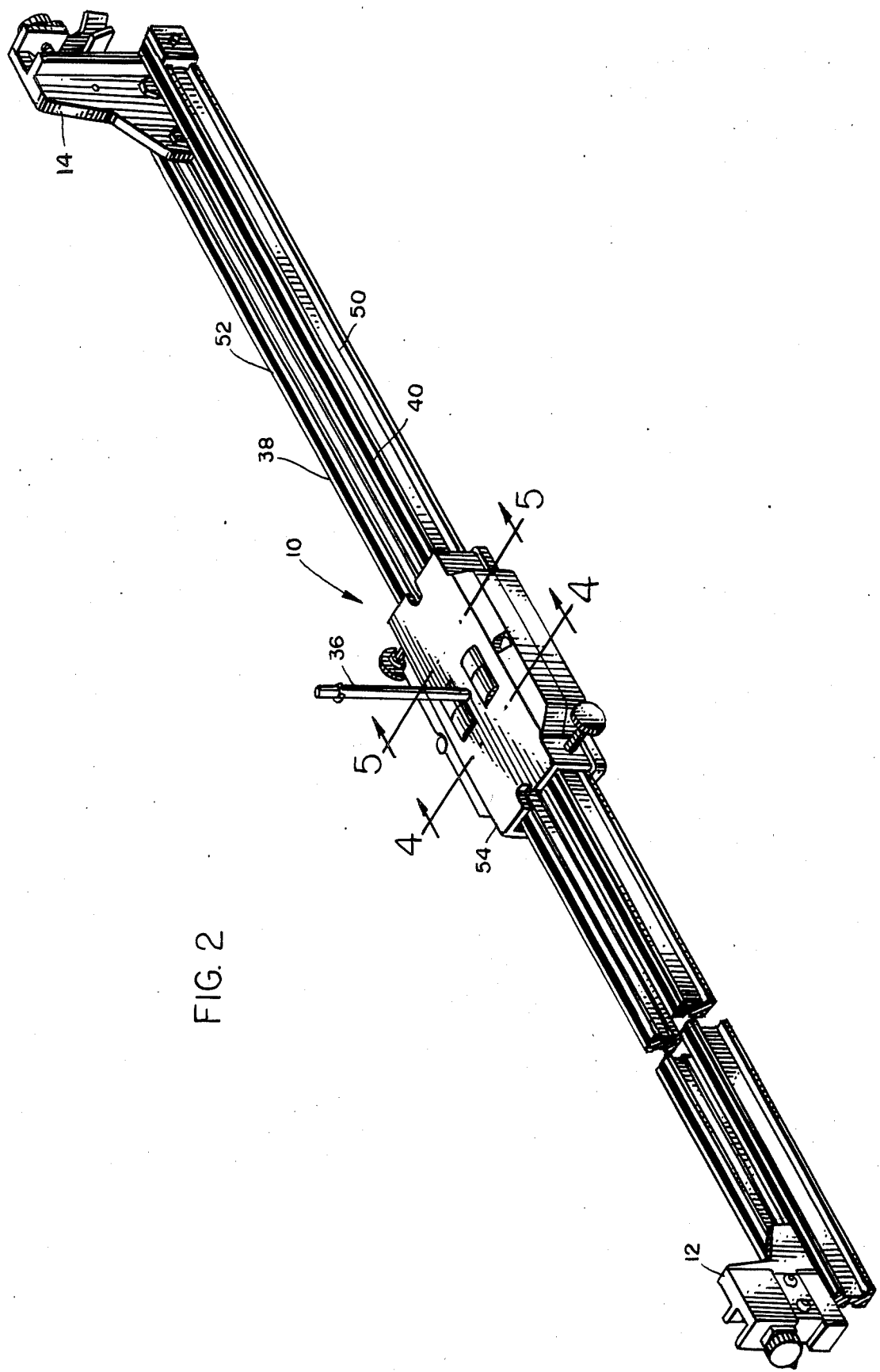
FIG. 2 is a perspective view of a single measuring bar device incorporating the concepts of the present invention.

FIG. 1 illustrates a multiple number of the measuring bar devices of the present invention arrayed in combination in a manner which they would be used. Thus, a first measuring bar device 10 includes clamps 12 and 14 at its opposite ends. The clamps 12 and 14 cooperate with vertical bars 16 and 18 respectively which are slidably or adjustably retained by the clamps 12 and 14. The end of each bar 16 and 18 includes a suspension pin or assembly 20 and 22 respectively. The pins 20 and 22 cooperatively engage with openings or other datum points on a vehicle frame or unibody vehicle construction in a manner known to those skilled in the art.

The present invention relates particularly to the construction of the measuring bar device 10. The clamps 12 and 14, vertical bars 16 and 18, and attachment pins 20 and 22 are of a general construction and utility known to those of ordinary skill in the art.

In practice, a series of measuring bar devices 10, as depicted in FIG. 1, are suspended or attached to a frame or unibody of a vehicle by any of a number of various types of pin or clamp constructions. Thus, there is depicted in FIG. 1, in addition to the clamps 20 and 22, alternative pin constructions 24 and 26, 28 and 30, 32 and 34, all of which are cooperative with bars 16, 18 held by clamps 12 and 14 for attachment of the measuring bar 10 to a vehicle body.

It should be noted that each measuring bar device 10 includes a vertically upstanding pointer 36 which in FIG. 1 is shown to be aligned with the center longitudinal axis 11 of a vehicle. The top surfaces of the measuring bar 10 device; namely, surface 38 of a bar 50 and surface 40 of a bar 52 are coplanar and are generally aligned with a particular datum plane associated with a vehicle. Positioning the top surfaces 38 and 40 relative to a datum plane is effected by adjustment of the vertical support bars 16, 18 in the clamps 12 and 14. Again, the arrangement and utility of a plurality of measuring bar devices 10 including the effective use of the center pointers 36 and alignment of the datum surfaces 38 and 40 is a technique generally known to those of ordinary skill in the art and is utilized in the automotive repair business. In practice then, if an automobile frame is appropriately aligned and undamaged, the pins 36 will lie on a common center line axis and the planes 38, 40 will lie in a common plane.

Typically an auxiliary measuring bar 42 can be used in combination with measuring bar devices 10. Such a bar 42 is supported in some fashion, for example, by independent brackets (not shown). The auxiliary bar 42 is likewise has a planar top surface 44 coplanar with the surfaces 38 and 40 and a center pin 46 aligned with the pins 36. Vertical bars 48 and 50 supported by clamps 52 and 54, respectively, at the opposite ends of bar 42 support a top cross bar 56 attached with clamps 58 and 60. In this manner it is possible to use pointers such as pointers 62 and 64 to measure reference points on the top as well as along the sides of a vehicle incorporating the auxiliary bar 42.

Figure 3:
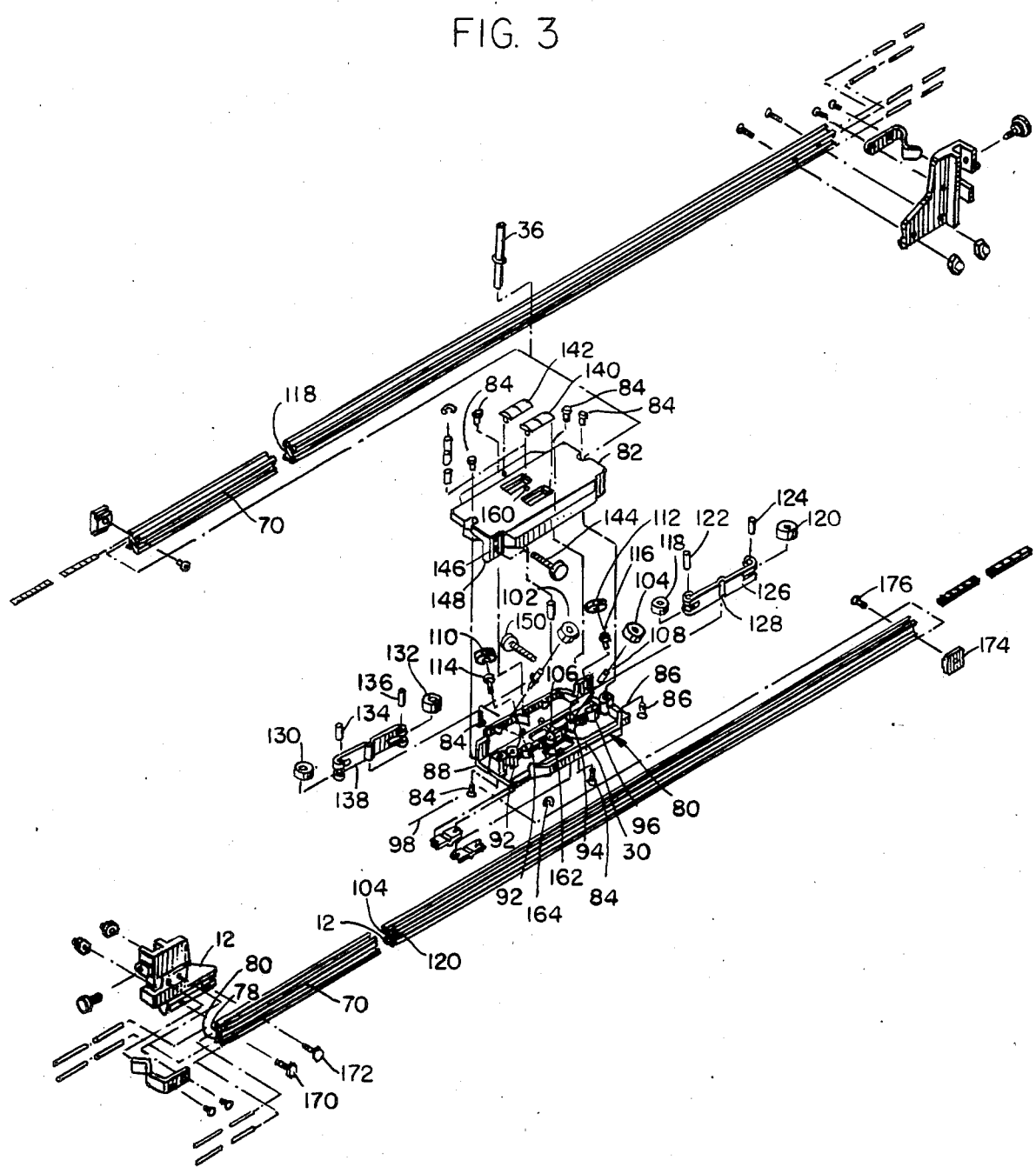
FIG. 3 is an exploded perspective view of the measuring bar device of FIG. 2.
Figure 4:
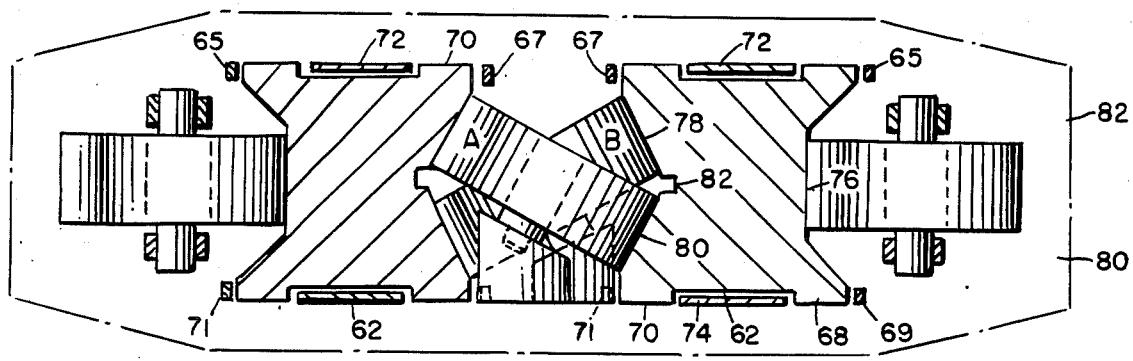
FIG. 4 is a cross sectional view of the measuring bar device of FIG. 2 taken substantially along the line 4—4.
Figure 5:
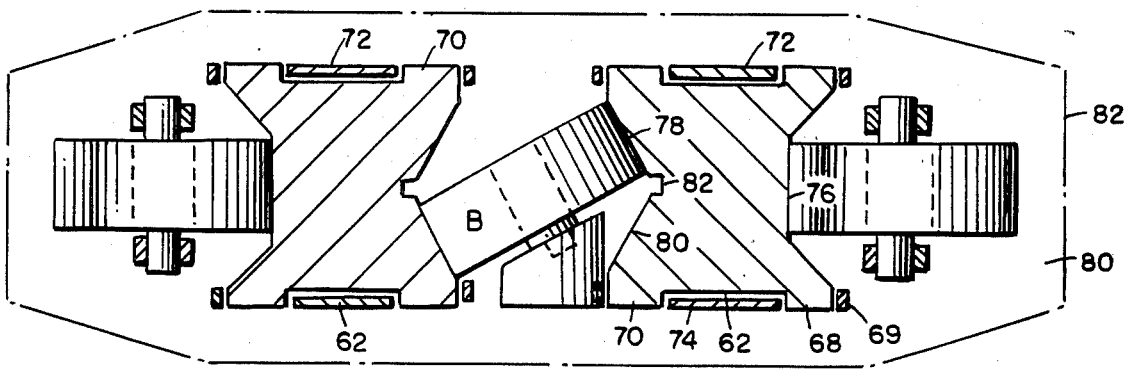
FIG. 5 is a cross sectional view of the measuring bar device of FIG. 2 taken substantially along the line 5—5.

As previously mentioned, the measuring bar device 10 and, in particular, the specific construction of a measuring bar device 10 constitutes the principal improvement and feature of the invention, that measuring bar device 10 being incorporated with and utilized in combination with similar measuring bar devices 10. FIGS. 2-5 illustrate in greater detail the specific construction of the measuring bar device 10. Therefore, referring to FIG. 3, the bar device 10 is comprised of a first elongated bar 50 and a second elongated bar 52. Each elongated bar 50 and 52 has an identical cross sectional configuration as depicted in FIGS. 4 and 5. However, the bars 50, 52 are aligned in opposite directions so that the planar side surfaces (to be described in greater detail below) are directed laterally outwardly with respect to the bar device 10. Each bar 50 and 52 thus has a generally uniform cross section along its entire length.

The two bars 50 and 52 each cooperate with a center housing 54. A clamp 12 is bolted to one end of bar 50. A clamp 14 is bolted to the opposite end of the bar 52. The clamps 12 and 14 do not, per se, constitute a part of the invention.

Referring first to FIGS. 4 and 5, there is depicted in cross section the construction of the elongated bars 50, 52 and housing 54. Each bar 50, 52 is similarly constructed. Bar 50, for example, is defined by a generally horizontal recessed planar top surface 60 and generally parallel, recessed bottom surface 62. Each surface 60 and 62 is flanked by longitudinal ribs 64 and 66 associated with recessed surface 60 and ribs 68 and 70 associated with recessed surface 62. Positioned within the recess defined by the ribs 64, 66 and against the planar horizontal surface 60 is a measuring tape 72 which extends the full length of the bar 50. The tape 72 includes numerical indicia thereon providing for a measurement of the length or distance along the tape from a center position on the bar or some other datum point along the bar 50. A measuring tape 74 is likewise provided within the recess between ribs 68 and 70 defining surface 62. The tapes 72 and 74 may be permanently affixed against their associated surface 60 or 62. Alternatively, the tapes 72 and 74 may be slidably positioned within said recesses against the surface 60 and 62, respectively.

The lateral sides of each rib 64, 66, 68 and 70 receive a colored tape 65, 67, 69 and 71, respectively. The tape 65, 67, 69, 71 is preferably of a highly visible color and runs the entire length of the bar 50. The color of the tape 65, 67, 69 and 71 may be varied from bar to bar. It is preferred that associated bars 50 and 52 associated with each bar device 10 have the same colored tape thereon. Different bar devices 10 may have different colors in order to identify that bar device 10 which is out of alignment with the other bar devices 10. For example, if a series of the bar devices 10 are arranged in a generally horizontal plane, yet one of the series is canted with respect to the plane, that canted bar can be visually sighted quickly based on the color coding associated with the bar device 10.

Referring again to FIGS. 4 and 5, the bar 50 also includes an outside vertical surface 76 extending the full length thereof. Surface 76 extends between the ribs 64 and 68.

The opposite side of the bar 50 includes first and second longitudinal inclined surfaces 78 and 80 which extend respectively from tibs 66 and 70 toward the center of the bar 50. The surfaces 78 and 80 intersect a center line groove 82 extending the length of the bar 50. The surfaces 78 and 80 form an angle with respect to vertical as depicted in FIGS. 4 and 5 on the order of 25°. However, this angle may be varied in accordance with desire. The angle is empirically determined to accommodate a number of requirements including (1) maximizing the width of roller contact with surfaces 78, 80 (the rollers are described in detail below); (2) maintenance of clearance between the edge of rollers (as described below) and the edges of surfaces 78, 80; and (3) physical maintenance of the bars 50, 52 in parallel array as a result of cooperation with the rollers (as described below).

Bar 52 is complementary to bar 50. That is, bar 52 constitutes substantially the mirror image of bar 50 as depicted in FIGS. 4 and 5. Consequently, in practice, a single aluminum extrusion may be utilized for the bars 50 and 52. The extrusion is cut to appropriate lengths and the inclined surfaces 78, 80 of the extrusion are arranged in opposed relationship.

Figure 3A:
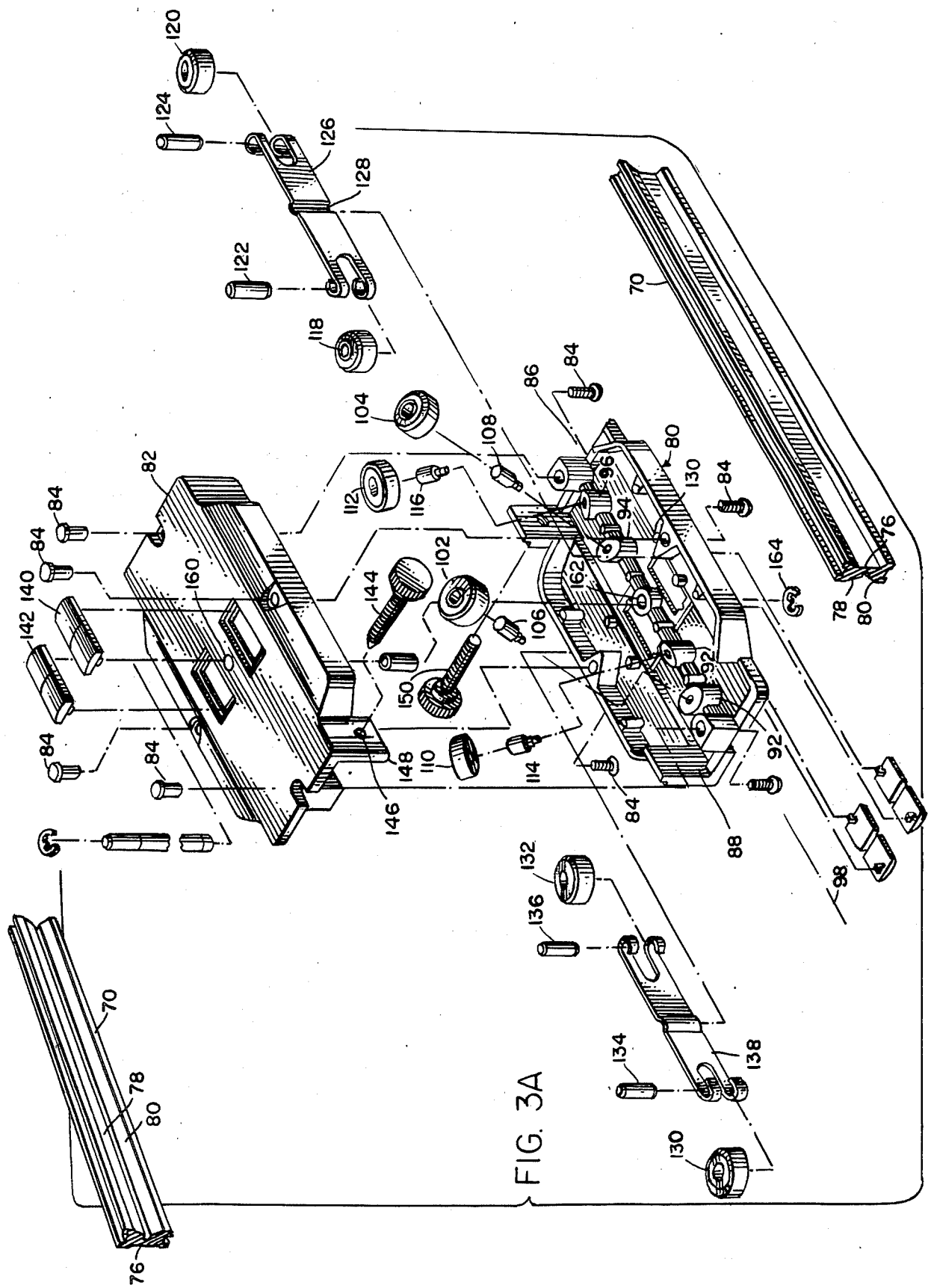
FIG. 3A is an enlarged partial perspective view of the housing depicted in FIG. 3.

The purpose for the arrangement of the inclined surfaces 78, 80 of the bar 50 and the bar 52 will become apparent in conjunction with the description of the housing 54 and its component parts. Referring to FIGS. 3-5, a housing 54 is comprised of a lower shell 80 and a compatible or upper shell 82. The shells are retained in assembled relation by fasteners 84 which extend through appropriate fastener openings or passages in the shells 80 and 82 as depicted in FIGS. 3 and 3A.

The lower shell 80 in cooperation with the upper shell 82 defines first and second parallel spaced channels 86, 88 for receipt of the bars 50 and 52, respectively. The channels, generally shown at 86 and 88, extend the length of the housing 54 and are separated by an intermediate row of roller support posts 90, 92, 94 and 96 which lie on a generally longitudinal axis 98 of the housing 54. Posts 90 and 94 define a roller support surface inclined at a complementary angle with respect to the surface 80 of the bar 50. Thus, cylindrical rollers or followers 102 and 104 are rotatably supported on bearings 106 and 108 inserted into the posts 90 and 94. Followers 102, 104 engage against the surface 80 of bar 50. Similarly, the posts 92 and 96 define a roller support surface inclined at an angle complementary with respect to surface 78 or bar 50. Support rollers 110 and 112 are mounted on bearings 114 and 116 so as to be in contact with surface 78 of bar 50.

All of the rollers 102, 104, 110 and 112 simultaneously contact or engage two opposed surfaces of the bars 50 and 52. For example, roller 102 will simultaneously frictionally engage surface 80 of bar 50 and surface 78 of bar 52. The roller 110, for example, will simultaneously, frictionally engage surface 78 of bar 50 and surface 80 of bar 52.

Positioned against the outside surface 76 of bar 50 are a pair of rollers 118 and 120 which are mounted respectively on bearings 122 and 124 supported by a spring clip 126 positioned within the shell 80. The spring clip 126 includes a semi-cylindrical indentation 128 which locks against a cam projection 130 and effectively biases the rollers 118 and 120 against the surface 76. This, in turn, maintains the bar 50 biased against the rollers 102, 104, 110, 112 which engage on the surfaces 78 and 80 of the bar 50.

The bar 52 is maintained in position in a similar manner by outside rollers 130 and 132 mounted on bearings 134 and 136 retained by spring clip 138 mounted in the shell 80 and retained therein by the upper shell 82. In this manner both bars 50 and 52 are simultaneously biased into frictional contact with all of the rollers 102, 104, 110, 112 along the axis 98 by the appropriately spring biased rollers 118, 120, 130, 132 against the side surface 76 of each bar 50 and 52.

See through window plates 140 and 142 are provided in the upper shell 82 so that a visual observation of the tape 72 may be made through the shell 82 at the center of the housing 54. A locking thumb screw 144 fits through a threaded opening 146 in a projecting flange or tab 148 on the upper housing or shell 82 for engagement with surface 76 of bar 50. This effects a locking of the bar 50 when the thumb screw 134 is screwed into place. In similar fashion, a locking thumb screw 150 is provided as depicted in FIG. 3 for locking the bar 52 in position. During normal initial setup operation, the locking thumb screw 144 and 150 are unbolted to permit free movement of the bars 50 and 52. A center pointer 36 fits through a center passage 160 in the shell 82 and 162 in the shell 80. The pointer 36 is retained by a C-clamp or C-washer 164.

The bar 50 includes clamp 12 attached at one end by bolts 170 and 172. At the opposite end, a bracket or stop member 174 is attached by a bolt 176 to the bar 50. Thus, the bar 50 cannot be removed from the housing 54 except by removal of the clamp 12 or stop 174 once the bars are assembled with the housing 54.

In operation, thumb screws 144 and 150 are loosened, movement of the bar 50 in one longitudinal direction will result in an equal and opposite movement of the bar 52 in the opposite, longitudinal direction. In this manner, the pointer 36 may be aligned with the center line of a vehicle, for example, and the bars 50, 52 may be simultaneously moved equally and in opposite directions to attachment positions beneath the vehicle. The amount of movement can be easily read through the windows 140 and 142 to ascertain that the bar movement has been in an equal amount. There is a center line scribe in each window 140 and 142 to enhance the accuracy of the reading.

It is noted that the frictional engagement of the rollers against the tracks or cam surfaces 78, 80 effect the equal and opposite movement of bars 50, 52. The spring clips 126 and 138 ensure the frictional engagement of the rollers and thus ensure the equal and opposite movement of the bars 50, 52. Once the bars 50, 52 are moved to desired position, of course, the locking thumb screws 144 and 150 may be locked.

By utilizing a plurality of rollers 102, 104, 110, 112 along the center line axis 98 of the housing 80, bending forces on the bars 50 and 52 are minimized and the bars 50, 52 are maintained in parallel alignment. Thus, there is a tendency to maintain the bars 50, 52 in a straight configuration without causing strain on the bars. Also by providing the rollers 100, 102, 110, 112 in the described angular relation with both bars 50, 52 and more particularly the surfaces 78, 80, the bars 50, 52 are thus maintained in an exact parallel relationship. These are very important advantages of the described construction.

Yet another very important advantage of the described housing construction is that the housing 54 provides minimum obstruction to the visual utility of the system. Housing 54 thus does not project unnecessarily above or below bars 50, 52.

In the event that the vehicle which is being measured is asymmetrical, it is possible to tighten one of the thumb screws 144, 145, for example thumb screw 144, to lock the bar 50 in position while simultaneously moving the second bar 52 a desired increment against the frictional forces of the rollers. Thus, the measuring bar assembly of the present invention may be used in a symmetrical as well as a non-symmetrical situation.

The measuring bar device 10 is otherwise utilized in the manner known to those skilled in the art. With the measuring bar device of the present invention, ease of operation and efficiency of use is greatly enhanced. It provides excellent visual access for the center line pins to detect visually the lateral alignment of the vehicle. The bars 50, 52, and more particularly the top surface of the bars 50, 52, are easily accessible for visual alignment of the vehicle in the vertical sense. Finally, the bars 50, 52 include scales or indicia which is an added advantage. Thus, while there has been shown a preferred embodiment of the invention, it is to be understood that the invention is to be limited only by the following claims and their equivalents.

What is claimed is:

1. An improved measuring bar assembly for use with automotive frame straightening equipment, comprising, in combination:

a first elongated bar and a second elongated bar generally parallel to the first bar, each one of the bars having opposite side surfaces, each side surface having a uniform configuration along an active length of the bar in the longitudinal direction, the first one of said surfaces defining at least two separate planar surface guide tracks, the other surface defining at least one planar surface guide track; said bars arranged with said first surfaces in opposed, uniformly spaced relation with pairs of guide tracks on the separate bars parallel to one another and defining mirror images with respect to one another;

a bar support housing, said housing including first and second longitudinally, parallel channels for receipt of the first and second bars respectively; said housing also including at least two generally opposed cylindrical follower members along the sides of each channel, said follower members each in line contact with the planar guide tracks of the bars and rotatable about the cylindrical axis thereof, said axis generally parallel to a planar guide track thereby defining a total of at least four follower members, at least two of said follower members being intermediate follower members positioned intermediate the channels, each such intermediate follower members mounted to simultaneously engage one pair of opposed, parallel guide tracks, and at least one remaining follower member being an outside follower member engaging the other surface of the first bar with the other remaining follower member also being an outside follower member engaging the other surface of the second bar, all of said follower members being supported for rotation on their cylindrical axes by the housing; and said follower members and guide tracks frictionally engaged and defining means for movement of the bars in equal and opposite directions.

2. The assembly of claim 1 including measuring indicia on the guide bars for indicating the position of said bars relative to one another.

3. The assembly of claim 1 including at least three intermediate follower members.

4. The assembly of claim 3 wherein the intermediate follower members are longitudinally spaced from one another in the housing and alternately engage the same guide track.

5. The assembly of claim 1 wherein the housing channels are enclosed about the lateral circumference of the bars.

6. The assembly of claim 1 wherein the housing includes a fixed pointer projecting transversely from the longitudinal axis of the bars and defining a center line.

7. The assembly of claim 1 including means at one end of each bar for attaching the bar to a body.

8. The assembly of claim 5 including indicia on at least one bar and a window in the housing providing visual access to indicia on said one bar.

9. The assembly of claim 1 including indicia positioned on corresponding surfaces of the bars parallel to each other.

10. The assembly of claim 1 including means for locking a bar to the housing.

11. The assembly of claim 10 wherein the means for locking comprise a locking screw in the housing and positioned to impinge on a bar.

12. The assembly of claim 1 in combination with a plurality of measuring bar assemblies affixed to a body and generally aligned in parallel array, alternate measuring bar assemblies being color coded with the same color.

13. The assembly of claim 1 including spring biasing means for biasing at least one outside follower member into engagement with a bar.

* * * * *